Nov. 21, 1961 C. M. SCHOTT 3,009,292
FOCUSING HEADER ASSEMBLY MACHINE
Filed Sept. 1, 1955 5 Sheets-Sheet 1
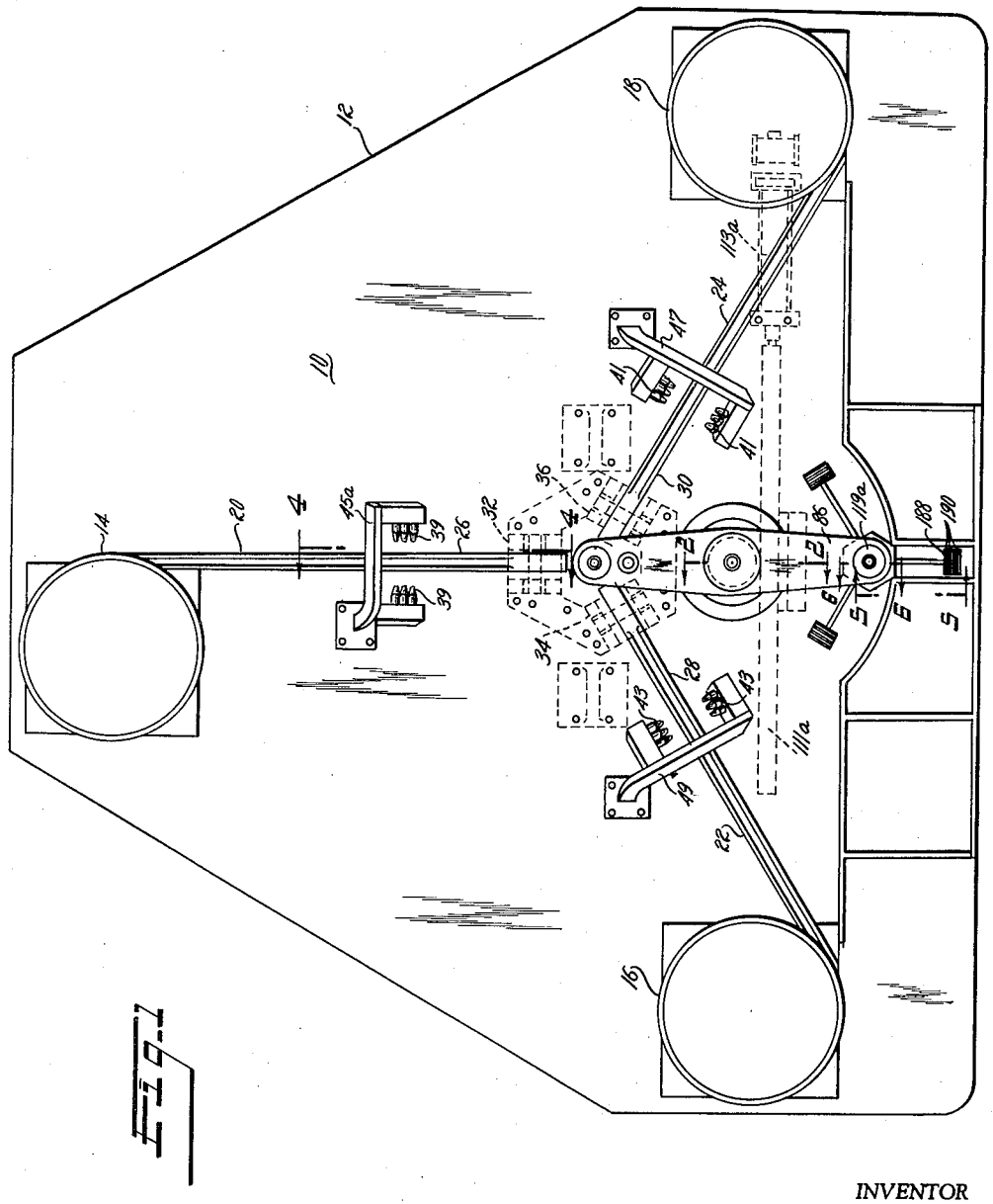
INVENTOR
CHARLES M. SCHOTT
BY
ATTORNEYS

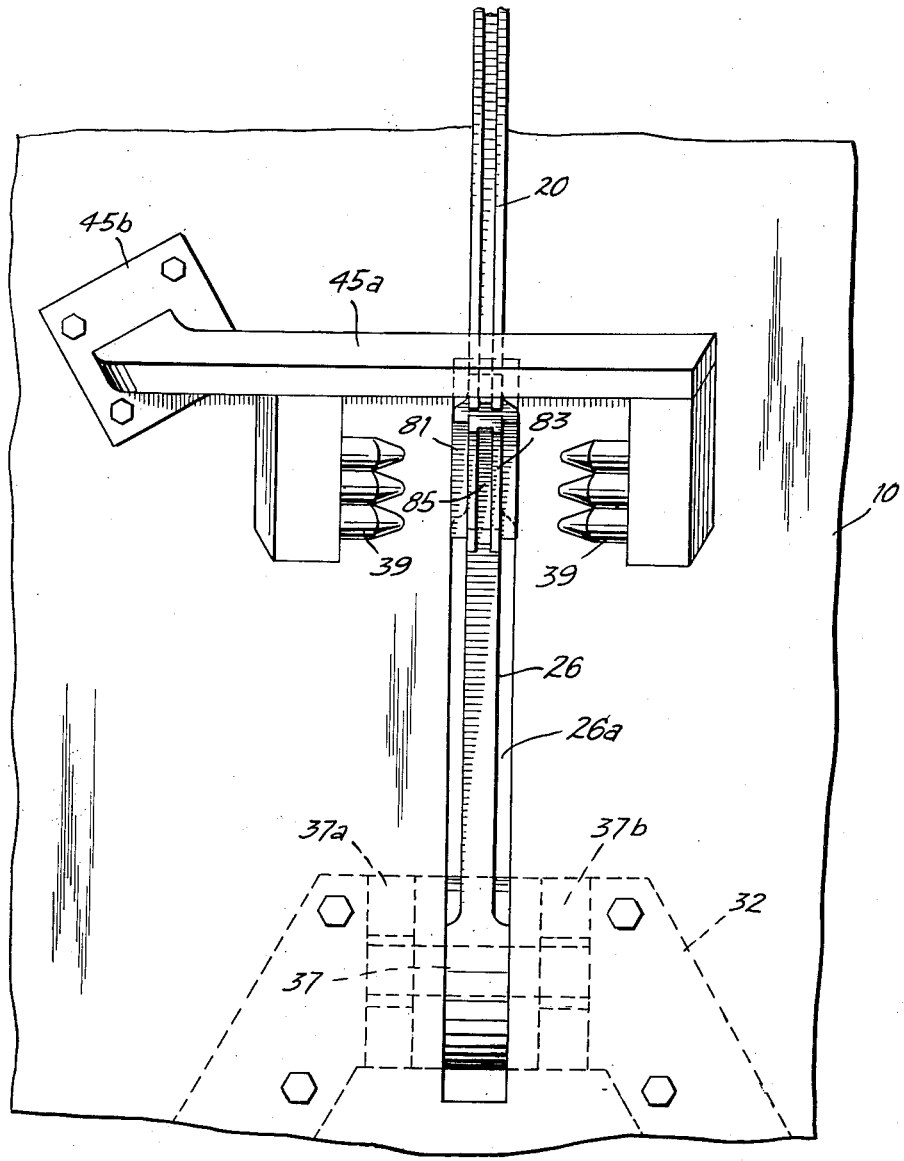

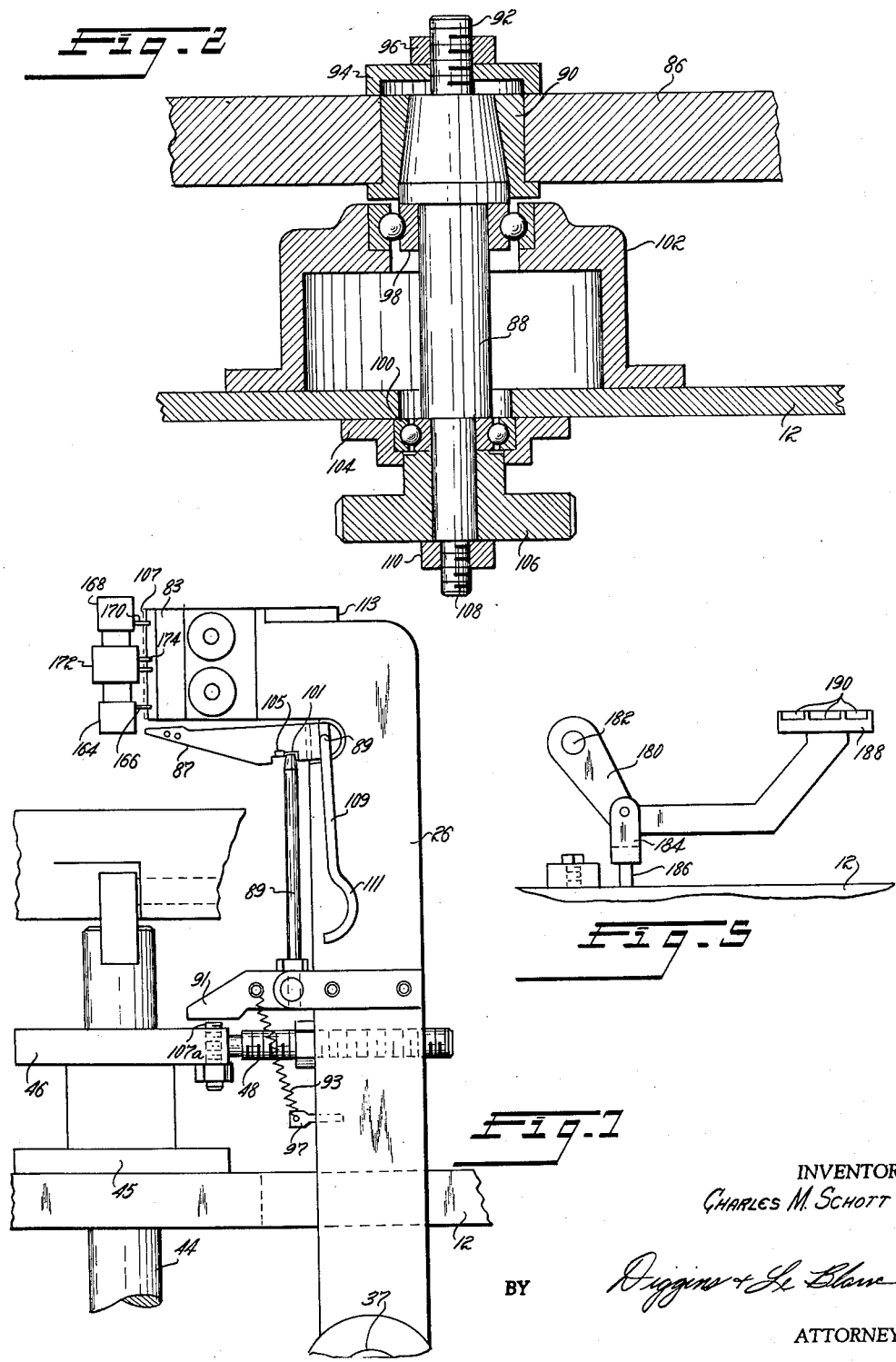

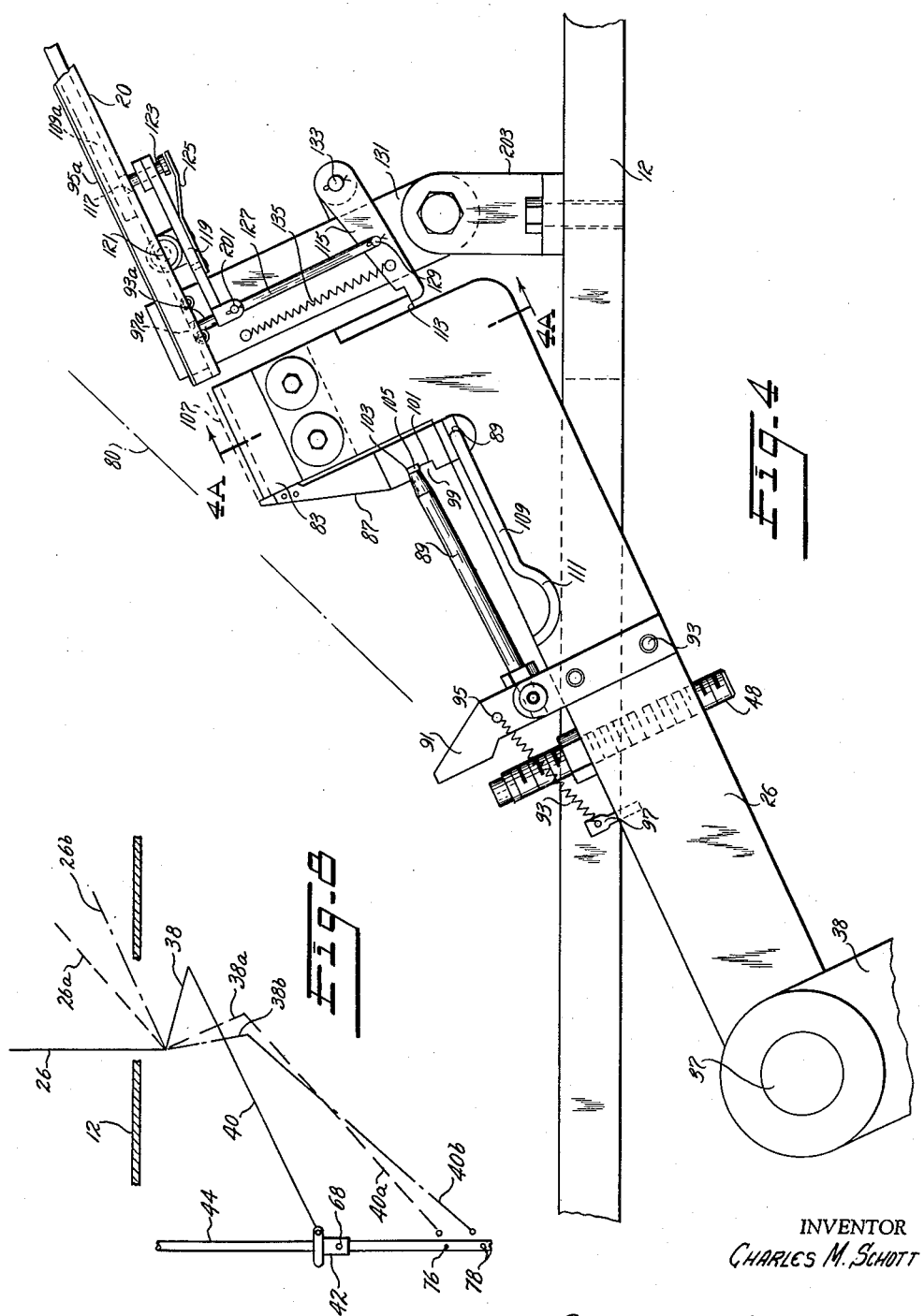

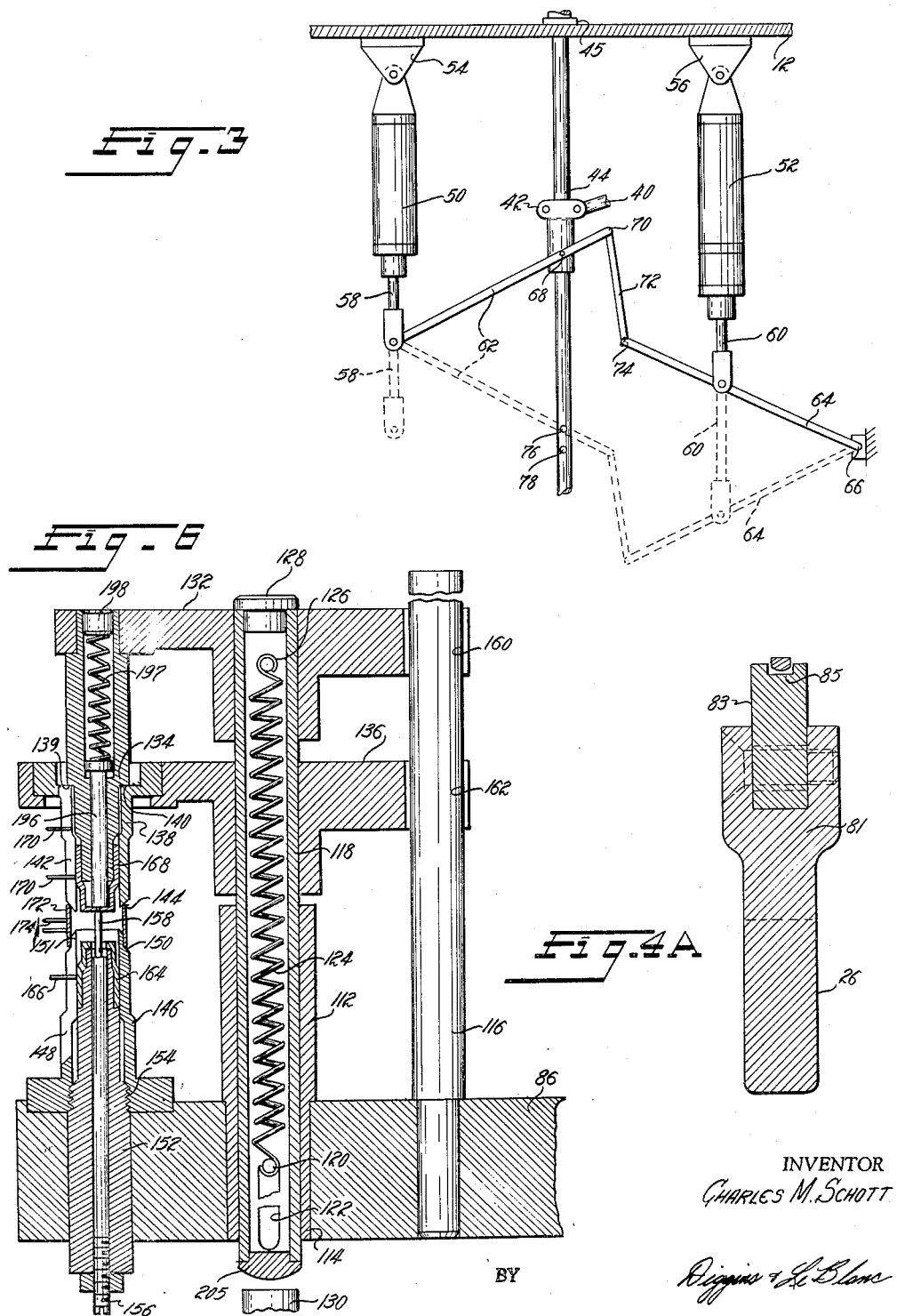

United States Patent Office 3,009,292
Patented Nov. 21, 1961

3,009,292
FOCUSING HEADER ASSEMBLY MACHINE
Charles M. Schott, Brookside, N.J., assignor to Thomas Electronics, Inc., Passaic, N.J., a corporation of New Jersey
Filed Sept. 1, 1955, Ser. No. 531,939
6 Claims. (Cl. 49—1)

This invention relates to an apparatus for manufacturing cathode ray tubes and more particularly relates to an apparatus for automatically manufacturing focusing header assemblies.

The focusing header of a cathode ray tube is generally made up as a sub-assembly of the electrostatic cathode ray gun and consists of four component parts, a first anode, a focusing ring or cylinder, a second anode and a plurality of glass rods joining the other parts together. The anodes, which are conventionally in the form of cups, and the focusing ring are usually provided with short radial wire studs welded to their outside circumferential surfaces at 120° spaced locations. Heretofore these parts have been assembled by accurately locating the two anodes and ring along a common axis, heating the glass rods to a plastic state, and then individually impaling the rods on the studs and cooling the assembly to lock all components together in their originally assembled position. This involves individual heating and impaling of the glass rods and since the operation has been largely manual it has been time consuming and relatively expensive.

It is a primary object of the present invention to provide an automatic focusing header assembly machine which materially speeds up the assembly of focusing headers.

It is another object of the invention to provide a rapid assembly automatic focusing header machine which is relatively simple in construction and in mode of operation.

It is another object of the invention to provide an automatic focusing header assembly machine which provides for the simultaneous heating and impaling of all of the glass rods of the focusing header.

It is another object of the invention to provide an automatic focusing header assembly machine which provides rapid and simple loading and unloading of parts by means of automatic locking and unlocking work holding fixtures which automatically align the focusing header parts.

It is another object of the invention to provide an automatic focusing header assembly machine having improved work holding fixtures which automatically lock and position the parts while providing an improved method of maintaining or changing the dimensional positioning of the parts.

It is another object of the invention to provide an automatic focusing header assembly machine having provision for automatic feed of glass rods.

It is another object of the invention to provide a focusing header assembly machine having provision for automatic feeding of glass rods wherein said rods are always positively clamped against accidental escape.

It is another object of the invention to provide an automatic focusing header assembly machine having suitable controls for providing full automatic recycling operation with manual cut-in for operation or repeat of any single movement.

Further objects and advantages of the invention will become apparent upon reference to the following specification and claims and appended drawings wherein:

FIGURE 1 is a plan view of the automatic focusing header assembly machine of this invention;

FIGURE 1a is an enlarged plan view of one of the press arms of FIGURE 1;

FIGURE 2 is a vertical cross section of the pivotal mounting of the fixture arm taken along the line 2—2 of FIGURE 1;

FIGURE 3 is a side view of the actuating cylinders for the press arms;

FIGURE 4 is a vertical elevation of one of the press arms taken on the line 4—4 of FIGURE 1;

FIGURE 4a is a section of the end of the press arm shown in FIGURE 4, taken on the line 4A—4A in FIGURE 4;

FIGURE 5 is a side elevation of one of the frit applicator arms taken on the line 5—5 of FIGURE 1;

FIGURE 6 is a vertical cross section of one of the work holding fixtures taken on the line 6—6 of FIGURE 1;

FIGURE 7 is a vertical elevation showing a press arm in an impaling position; and FIGURE 8 is a diagrammatic showing of the three positions of the press arms and their actuating linkages.

Referring more particularly to the figures of the drawing, there is shown in plan view in FIGURE 1 an automatic focusing header assembly machine 10 consisting of a table 12 carrying a series of elevated hoppers 14, 16 and 18 which receive glass rods of the type used in assembling the electrode elements of the focusing headers of cathode ray tubes. A glass track 20, 22 and 24 is attached to each of these hoppers and leads downwardly towards the central portion of the table 12. The lower end of one such track is shown in FIGURE 4.

FIGURE 1a shows an enlarged plan view of the lower end of track 20 and press arm 26. The remaining tracks and arms are similarly constructed. Table 12 is provided with an elongated slot 26a through which moves press arm 26. The lower end of the press arm is supported on journal 37 received in downwardly extending flanges 37a and 37b provided on a bracket shown by dashed lines at 32. Burner 39 is supported from the table by hollow bracket 45a and bolting plate 45b. The upper end of the press arm terminates in slotted section 81 carrying heating block 83 with a glass rod holding slot 85, also seen in FIGURE 4a. Press arm 26 terminates just short of the end of track 20 as also shown in FIGURE 4.

A series of press arms 26, 28 and 30 is pivotally mounted at 120° spaced positions around the central part of the table on brackets 32, 34 and 36, and one of these press arms is shown in detail in FIGURE 4. Referring to FIGURE 4, each of the press arms 26, 28 and 30 is pivoted upon a journal 37 and has a bell crank lever 38 extending from one end thereof. The end of the bell crank lever 38 is attached to a connecting rod 40, as seen in FIGURES 3 and 8. The connecting rod 40 has its other end connected to a spider 42 which slides on a guide rod 44 fixed to the table 12 by means of a clamping flange 45. The guide rod 44 extends through table 12 and has a collar 46 affixed to the top thereof to engage stop screws 48 which are carried by the press arms in order to limit their upward movement. Collar 46 also carries a plurality of screws 107a which actuate pawls 91 in a manner to be described presently. A set of gas burners 39, 41 and 43 is mounted astraddle each press arm by means of a series of hollow brackets 45a, 47 and 49 which act as conduits for the gaseous fuel for the burners, as best seen in FIGURES 1 and 1a.

The spider block 42 is actuated by means of the press arm linkage shown in detail in FIGURES 3 and 8. A pair of pneumatic cylinders 50 and 52 are pivotally mounted beneath the table 12 by means of a pair of brackets 54 and 56. The cylinders 50 and 52 are provided with piston rods 58 and 60 which are pivotally attached to levers 62 and 64. The lever 64 is pivoted at 66 to a stationary support, while the lever 62 is a bifurcated saddle type of lever which is pivoted by journals 68 to the spider 42.

The end of lever 62 is pivoted at 70 to a link 72 which is connected at its other end 74 to the end of lever 64.

The piston rods 58 and 60 in the cylinders 50 and 52 are each capable of assuming one of two arcuately located positions in order to provide three positions for the spider 42. Thus in the uppermost position of the spider 42, shown in solid lines in FIGURES 3 and 8 the piston rods 58 and 60 of cylinders 50 and 52 are both in their uppermost positions. For the intermediate position of spider 42, shown by the broken line position of the levers 62 and 64, the journals on the spider are at 76, the piston rod 58 in cylinder 50 remains in its uppermost position, and the piston rod 60 in cylinder 52 is extended to its lowermost position. For the lowest position of spider 42 the piston rod 60 of cylinder 52 remains in its lowermost position, as shown by the broken lines in FIGURE 3, while piston rod 58 of cylinder 50 is extended to its lowermost position, as shown by the broken lines, to lower the journals on the spider to the position 78.

Referring to FIGURES 4 and 8 it will be seen that these three positions of the spider 42 cause the press arm 26, 28 and 30 to assume a lowermost position shown by the solid lines in FIGURE 4, and by the long dashed line 26b in FIGURE 8, at which position loading occurs, an intermediate position shown by the center line 80 in FIGURE 4 and by the dashed line 26a in FIGURE 8, at which firing of the glass rod occurs, and an uppermost position shown in FIGURE 7 and also shown by the solid line 26 in FIGURE 8, at which position impaling of the glass rods occurs. Referring to FIGURE 8 it will be seen that the bell crank lever 38 also occupies three positions, shown at 38, 38a and 38b. The connecting rod 40 determines the position of the bell crank lever, as shown in FIGURE 8, and itself occupies positions 40, 40a and 40b, as determined by the position of the spider 42. Each press arm 26, 28 and 30 is provided with a slotted section 81 which carries a glass rod heating block 83, as best seen in FIGURE 4a, and each block 83 is provided with a groove 85 at its upper edge for holding the glass rods.

In order to have each press arm convey a rod to a position where it is impaled upon the studs of a focusing header assembly, each press arm carries a stop lever 87 pivoted thereto at 89, and the stop lever is held close against the end of the slotted heating block 83 by means of a trigger 89 and pawl 91 pivoted to the press arm 26 at 93. The pawl 91 is urged in a counterclockwise direction in FIGURE 4 by means of the spring 93 which is attached to the pin 95 on the pawl and to an anchoring lug 97 in the press arm. The end of the trigger 89 rides in a slot 99 in the stop lever 87. The lowermost portion of the slot 99 is cut to a lower level 101 than the uppermost portion of the slot 103 and a wear block 105 is provided to form the junction between the two different levels.

When the press arm is rotated to an impaling position, shown at 26 in FIGURE 8 and also in FIGURE 7, a stop 107 on the collar 46 cocks the pawl 91 and trigger 89 to force the end of the trigger into the deeper portion of the slot 101. This allows the stop lever 87 to drop by gravity so as to avoid pulling the glass rod away from the work parts when the press arms return to their lowermost or load position shown in FIGURE 4 and at 26b in FIGURE 8. A reset arm 109 is attached to the stop lever 87 and is provided with a looped end 111. As the press arms return to the load position, shown in FIGURE 4, the looped portion 111 of the reset lever 109 strikes the table top and cocks the stop lever into the closed position where it is held by the spring 93, pawl 91 and trigger 89. The arms are then ready to receive another rod.

The press arm is provided with a shoulder block 113 which engages with lever arm 115 of the track discharge mechanism. Each of the glass tracks 20, 22 and 24 is provided with a top cover 95a and a pair of apertures 97a and 117 in the bottom thereof. A plunger 93a extends through the aperture 97a and is carried by one end of a rocker 119 which is pivoted to the glass track at 121. The other end of the rocker 119 slidingly receives a plunger 123 which is urged upwardly by means of a leaf spring 125. The rocker 119 is urged in a clockwise direction by means of a link 127 pivoted to the rocker at 201 and pivoted to lever arm 115 at 129. The lever arm 115 is in turn pivoted to a support member 131 at 133 and is urged upwardly by means of a spring 135. The support member 131 is secured to the table 12 by means of a bracket 203.

When the press arm 26 is down in its loading position, as shown in FIGURE 4, shoulder 113 depresses lever arm 115 to tilt rocker 119 so as to withdraw plunger 93a from aperture 97a. At the same time plunger 123 is forced upwardly by leaf spring 125 to hold glass rod 109a in position, clamping it against the top plate 95a. Withdrawal of plunger 93a permits the lowermost glass rod 107 to leave the track and enter the grooved block 83 coming to rest against stop lever 87. When the press arm rises to the intermediate firing position, the glass rod thereon is heated and is thence moved to the uppermost position shown in FIGURE 7, where it is impaled upon the studs on the anodes and ring of the focusing header. Since each of the press arms is connected to the spider 42 they all move simultaneously to mount the three glass rods at one time.

As has been stated, the three-press arms 26, 28 and 30 simultaneously impale heated glass rods on the studs of the electrodes of the focusing header which is located at the center of the press arms at the "work" position. Referring to FIGURES 1 and 2, these focusing header electrodes are held in position by a fixture or chuck assembly which is mounted on one end of a fixture arm 86 rotatably supported on table 12. Details of this pivotal mounting are shown in FIGURE 2. Referring to that figure, a shaft 88 is attached to the fixture arm 86 by means of a collar 90, stud 92, spider 94 and bolt 96. The shaft 88 is received in a pair of ball bearing races 98 and 100 mounted in brackets 102 and 104 on the table 12. A gear 106 is keyed to the bottom of shaft 88 by means of a stud 108 and nut 110 and this gear engages a rack 111a which is actuated by the piston in cylinder 113a as seen in FIGURE 1. Horizontal movement of rack 111a under the influence of cylinder 113a causes shaft 88 to rotate to turn the fixture arm 86 through 180°, each work holding fixture or chuck assembly is thus movable into a load position over a piston 130, to be discussed hereinafter, and into a work position at the center of the press arms.

Referring to FIGURE 6 it will be seen that each work fixture or chuck assembly consists of a bushing 112 mounted in an aperture 114 in the end of the fixture arm 86. An actuator tube 118 is slidably received within the bushing 112 and is keyed thereto by means of a pin 120 mounted in the bushing 112 and riding in a slot 122 in the actuator tube. A coil spring 124 has its lower end connected to the pin 120 and has its upper end connected to a pin 126 in the upper end of actuator tube 118. A plug 128 closes the upper end of tube 118 and a plug 205 closes the lower end. The spring 124 biases the actuator tube 118 downwardly so that the tube 118 is always under downward tension. The upper end 130 of an actuating piston is located immediately below the lower end of the actuator tube at the loading station. This piston is actuated by a cylinder similar to cylinders 50 and 52.

The actuator tube 118 has a top arm 132 affixed thereto by means of a set screw or pin, not shown, and this top arm carries a top post 134 mounted therein. A slide 136 is affixed to the actuator tube 118 below the top arm 132 and receives a top chuck 138. The top post 134 has a shoulder 139 which engages the top chuck 138 at 140. The depending end of the top chuck 138 is sectioned by 3 vertical slots 142 only one of which is visible in FIGURE 6, spaced 120° apart and has a beveled end surface 144.

A bottom chuck 146 is mounted on the fixture arm 86 and is also provided with 3 slots 148 and a beveled edge 150. The bottom chuck has a reduced diameter portion 151 at the end thereof extending beyond a beveled edge 150 and this reduced diameter portion is of such a diameter as to receive the ring 172. A bottom post 152 extends into the bottom chuck and is screw threaded thereto at 154 to permit adjustable positioning of the end of the bottom post with respect to the beveled upper edge of the bottom chuck. An aperture adjustment rod 156 is screw threadedly received within the bottom post 152 and terminates in a reduced diameter spacing member 158 which correctly spaces the top and bottom anodes with respect to one another.

The top arm 132 and the slide 136 are provided with slots 160 and 162 which receive a square guide post 116 mounted in the fixture arm 86 to prevent rotational movement of these members and to maintain the top chuck in axial alignment with the bottom chuck.

Upon energization of the cylinder which actuates the piston 130, the actuating tube 118 is forced upward to raise the top arm 132 and slide 136 thereby separating the top and bottom chucks. The operator thereupon inserts a bottom anode 164 into the bottom chuck over the spacing member 158 and bottom post 152. The metal studs 166, with which such anodes are normally provided, extend out through the slots 148 in the chuck 146. The top anode 168 is then inserted into the top chuck with its studs 170 extending through the slots 142 and the focusing ring 172 is then placed upon the beveled edge 150 of the bottom chuck 146 with its studs 174 extending in the same direction as the studs 166 and 170 on the lower and upper anodes respectively. When the piston 130 releases the actuating tube 118 the top arm 132 and slide 136 are lowered under the tension of the spring 124 so that the beveled edge 144 on the top chuck 138 engages the focusing ring to force it downwardly into compressed engagement with the beveled edge 150 on the bottom chuck 146.

This seating of the focusing ring on the beveled edges 144 and 150 simultaneously accomplishes a constriction of the chucks to lock the anodes into aligned positions and to align the focusing ring.

Spacing between the upper and lower anodes is set by means of the adjusting screw 156. When the anodes and focusing ring are loaded with the chucks apart, the centrally located aperture in the lower anode falls over the spacing member 158 and bottoms on the uppermost edge of the lower post 152. The top anode is inserted in the top chuck and its aperture rests against a spring post 196 which is forced downwardly by means of a coil spring 197 held by plug 198. As the chucks are brought together and before bevels 144 and 150 contact the focusing ring to clamp the anodes, the upper anode aperture bottoms on tip 158, which is of a larger diameter than the aperture, and is held at a definite distance away from the lower anode. Continued lowering of the top chuck to a locking position forces the spring post 196 upward while the spring 197 continues to hold the top anode in position against the spacing member 158. A second adjustment in the assembly is provided for by movement of the threaded bottom post 152 within the bottom chuck 146. Raising or lowering this post moves both top and bottom anodes in unison with respect to the focusing ring without disturbing the spacing between them.

Referring to FIGURE 1, the frit applying arms 180 are mounted on table 12 at 120° spaced locations about the fixture or chuck assembly in the load position. Turning now to FIGURE 5 it is seen that each of these frit applying arms 180 is pivoted to table 12 by a pivot 182 and is actuated by means of a bifurcated connector 184 connected to a piston 186 on an actuating cylinder, not shown. A frit carrier 188 is mounted on the end of each arm 180 and is provided with a plurality of grooves 190. At the start of operations the operator fills the grooves 190 with a viscous paste of frit which will handle approximately 200 focusing headers before it needs to be refilled. When the pistons 186 rise, the arms 180 pivot about the point 182 to raise the frit carriers 188 to a vertical position where the studs 166, 170 and 174 on the anodes and focusing ring respectively enter the frit in the grooves 190 and become coated therewith.

The operation of the device is as follows:

Prior to starting operation the hoppers 14, 16 and 18 are filled with glass rods which slide in serial form down the glass tracks 20, 22 and 24, as is best seen in FIGURE 4. If the press arms are not in their lowermost positions (26b in FIGURE 8) the levers 115 are held in their uppermost positions by means of the spring 135 so that the plungers 93a stop downward movement of the glass rods. When the press arms 26, 28 and 30, FIGURE 4, are depressed to the load position (26b in FIGURE 8) the shoulder 113 engages the lever arm 115 to depress the plunger 93a and rotate the rocker 119 in a counterclockwise direction so that plunger 123 engages glass rod 109a to halt downward movement of the glass rods thereabove. Retraction of lever 93a allows glass rod 107 to slide into the groove 85 in block 83 and this glass rod comes to rest against stop lever 87. When the press arms 26, 28 and 30 are in this lowermost load position 26b in FIGURE 8 the piston rods 58 and 60 on the cylinders 50 and 52 are both in their lowermost positions, the bell crank is in position 38b in FIGURE 8, and the connecting rod is in position 40b.

The piston 58 in cylinder 50 is then caused to rise to its uppermost position by any suitable control means, thereupon raising the spider 42 to move the press arms to the fire position shown in FIGURE 4 and shown at 26a in FIGURE 8. At this position the glass rods held in the grooves 85 are heated by means of the burners 39. After a suitable period of heating during which the rods reach a temperature at which they are plastic, the piston rod 60 of cylinder 52 is retracted to its uppermost position, as shown in FIGURE 3, thereupon raising the press arms 26, 28 and 30 to their uppermost position as shown in FIGURE 7 and shown at 26 in FIGURE 8. At this position the pawl 91 engages the stop 107a to allow the stop lever to fall and the heated and softened rods are impaled upon the studs 166, 170, 174 upon the anodes and focusing ring respectively. The press arms are then lowered to the loading position, shown at 26b in FIGURE 8 by the action of the cylinders 50 and 52 which returns spider 42 to its lowest position 78. As the press arms reach the loading position the loop 111 on reset lever 109 engages the table to again cock the stop lever 87.

After the glass rods have been impaled upon the studs upon the anodes and focusing ring, the piston in cylinder 113 (FIGURE 1) actuates the rack 111 to cause it to move horizontally to turn gear 106 and thus to rotate the fixture arm 86 through 180° so as to return the finished focusing header assembly to the loading position over piston 130, as shown at 119 in FIGURE 1. During the time that the press arms are receiving glass rods and moving these rods up to the impaling position about the header assembly fixture in the work position, the piston 130 below the mounting fixture which is then in the load position, unlocks the fixture and the operator mounts a pair of anodes and focusing ring within the chucks as explained heretofore. Thus when the fixture arm 86 rotates to remove the finished focusing header assembly from amidst the press arms, it rotates a second fixture from the load to the work position. Prior to every rotation of the arm 86 the frit applying arms 180 are moved upwards by means of the pistons 186 in order to apply frit to the studs 166, 170 and 174 upon the anodes and focusing ring respectively. The piston in cylinder 113 thereafter actuates the rack 111 to rotate the arm 86 through 180° to return the completed focusing header assembly which is then at the work position to the loading position at 119a as best seen in FIGURE 1. The piston 130 at position 119 thereupon separate chucks 138 and 146 and the operator removes the completed focusing header assembly and mounts new anodes and a focusing ring.

It will thus be seen that the operation of the machine is quite efficient in that the unloading of a completed focusing header assembly and the loading of the parts for a new assembly occur simultaneously with the loading, heating and impaling of the glass rods. The work holding fixtures are automatically unlocked when the completed assembly arrives at the loading position and are automatically locked prior to the time that the loaded fixture moves away from the loading position. The fixtures automatically align and space the anodes and ring and provide for easy adjustment of the positions of the various parts with respect to one another. The application of flux is automatic as is the feed of glass rods and all of the other assembly operations. Maintenance is greatly reduced and a much improved method of maintaining or changing dimensional positioning of the various focusing header assembly parts is provided. The controls for the various actuating cylinders provide complete automatic recycling with manual cut-in for operation or repeat of any single movement.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a machine for assembling the electrodes of a focusing header, a supporting table, a fixture arm rotatably mounted on said table, a pair of spaced chuck assemblies for mounting two sets of electrodes in spaced positions with the longitudinal axis of said sets of electrodes parallel to each other, each of said chuck assemblies being carried by opposite ends of said fixture arm, said fixture arm being rotatable through a path parallel to the plane of said table to carry said chuck assemblies in a circular path about an axis parallel to said axes of said electrodes, drive means supported from said table and operatively connected to said fixture arm for rotating said fixture arm to sequentially move said chuck assemblies into a load position and a work position, a work station on said table including a plurality of arms pivotally secured to said table for rotational movement in planes substantially perpendicular to the plane of said table, said arms having free ends carrying means for receiving insulating rods, insulating rod feed means mounted on said table about said work station, said arms being rotatable to place said free ends and said rod receiving means adjacent said insulating rod feed means whereby insulating rods may be fed to said rod receiving means, said pivoted arms being rotatable to bring said free ends and said rod receiving means upward from said feed means to a focusing header carried by the chuck assembly when in said work position in such close proximity thereto that insulating rods carried by said rod receiving means engage said focusing header, and means for simultaneously rotating the pivoted arms at said work station to bring the free ends thereof to said focusing header in said chuck assembly at said work station whereby rods carried by said arms are brought into contact with the electrodes of said focusing header.

2. A machine as set out in claim 1 wherein said feed means include a hopper for insulating rods associated with each said arm and an insulating rod track extending downwardly from each hopper to a position adjacent the free end of its associated arm when said arms are at said feed means, means on each track for arresting the movement on insulating rods therein, and means on each arm engaging and moving said arresting means whereby insulating rods in said tracks are fed to said receiving means on said free ends of said arms.

3. A machine as set out in claim 2, wherein said means for moving said arms comprises a link connected to each arm and connected to a spider, a pair of hydraulically driven pistons, and means connecting said pistons to said spider.

4. A machine as set out in claim 3, wherein said means connecting said spider to said pair of pistons comprises a first link connected at one end to one of said pistons and connected intermediate its ends to said spider, a second link connected at one end to a stationary support and connected intermediate its ends to the other of said pistons, and a third link connected between the other ends of said first and second links.

5. In a machine for assembling the two anode and ring electrodes of a focusing header by means of insulating rods adapted to have secured therein studs projecting from said electrodes, the combination comprising a supporting table, chuck means on said table for mounting said electrodes in alignment on a single vertical axis, a plurality of arms symmetrically arranged and extending radially outward from said single vertical axis, said arms being pivoted on horizontal axes below the electrodes held by said chuck means, and having free ends carrying rod receiving means, a rod feed means mounted on said table adjacent each said arm, said arms being rotatable to lower positions wherein said rod receiving means are aligned with said feed means whereby rods may be fed from said feed means to said receiving means, said arms when in said lower positions being at a substantial angle to said axis, and means supported by said table for simultaneously rotating said arms upward from said lower positions to bring said free ends and rod receiving means into proximity to electrodes carried by said chuck means to engage the studs on said electrodes with rods carried by said receiving means to attach said rods to said electrodes.

6. A device as set out in claim 5 wherein said rotating means includes a multiple piston driven spider for rotating said arms from said lower positions to positions where said free ends are in proximity to said electrodes in steps, heating means mounted on said table, one said step bringing said free ends to rest adjacent said heating means whereby rods in said receiving means are softened by heat.

References Cited in the file of this patent

UNITED STATES PATENTS

| | | |
|---|---|---|
| 2,174,853 | Bowie | Oct. 3, 1939 |
| 2,327,352 | Hoover | Aug. 24, 1943 |
| 2,342,392 | Evans et al. | Feb. 22, 1944 |
| 2,600,076 | Schelling | June 10, 1952 |
| 2,707,848 | Pityo | May 10, 1955 |
| 2,768,475 | Seelen et al. | Oct. 30, 1956 |
| 2,778,161 | Zaphiropoulos | Jan. 22, 1957 |
| 2,778,966 | Faustini et al. | Jan. 22, 1957 |
| 2,779,134 | Gates | Jan. 29, 1957 |

UNITED STATES PATENT OFFICE
CERTIFICATE OF CORRECTION

Patent No. 3,009,292            November 21, 1961

Charles M. Schott

It is hereby certified that error appears in the above numbered patent requiring correction and that the said Letters Patent should read as corrected below.

Column 6, line 1, for "the" read -- three --; column 7, line 54, for "axis" read -- axes --.

Signed and sealed this 17th day of April 1962.

(SEAL)
Attest:

ESTON G. JOHNSON

Attesting Officer

DAVID L. LADD

Commissioner of Patents